United States Patent Office 3,451,471
Patented June 24, 1969

3,451,471
CONTINUOUS HEAT TREATMENT OF LIQUID PRODUCTS
Bengt Arne Palm, Genarp, Sweden, assignor to Alfa-Laval AB, Tumba, Sweden, a corporation of Sweden
Filed Apr. 24, 1967, Ser. No. 633,027
Claims priority, application Sweden, Apr. 25, 1966, 5,545/66
Int. Cl. A23c *3/02, 9/10, 9/00*
U.S. Cl. 165—66    11 Claims

ABSTRACT OF THE DISCLOSURE

A first pipeline system includes a starting point for the liquid product to be heat treated, the primary side of indirect heat exchange means for heating the product, the primary side of indirect heat exchange means for cooling the product, and means for returning the product to the starting point for repeated treatment in the system in the event of failure of the product to acquire a predetermined heat treatment temperature from the heating. A second pipeline system forms a circuit for a second liquid product and includes the secondary sides of the heat exchange means, whereby the product under treatment in the first system is in indirect heat exchange relation to another liquid product in the second system. Preferably, the heat exchange means for cooling the first product include forward flow and return flow regenerative heat exchangers, the aforesaid return means including a first valve connected between the primary sides of these exchangers and operable in one position to discharge the first product and in another position to feed it from the forward flow to the return flow exchanger, the second pipeline system including the secondary sides of the regenerative exchangers connected in parallel to each other and also including a second valve for directing the second liquid product selectively through one or the other of these exchangers.

---

Figure 1:
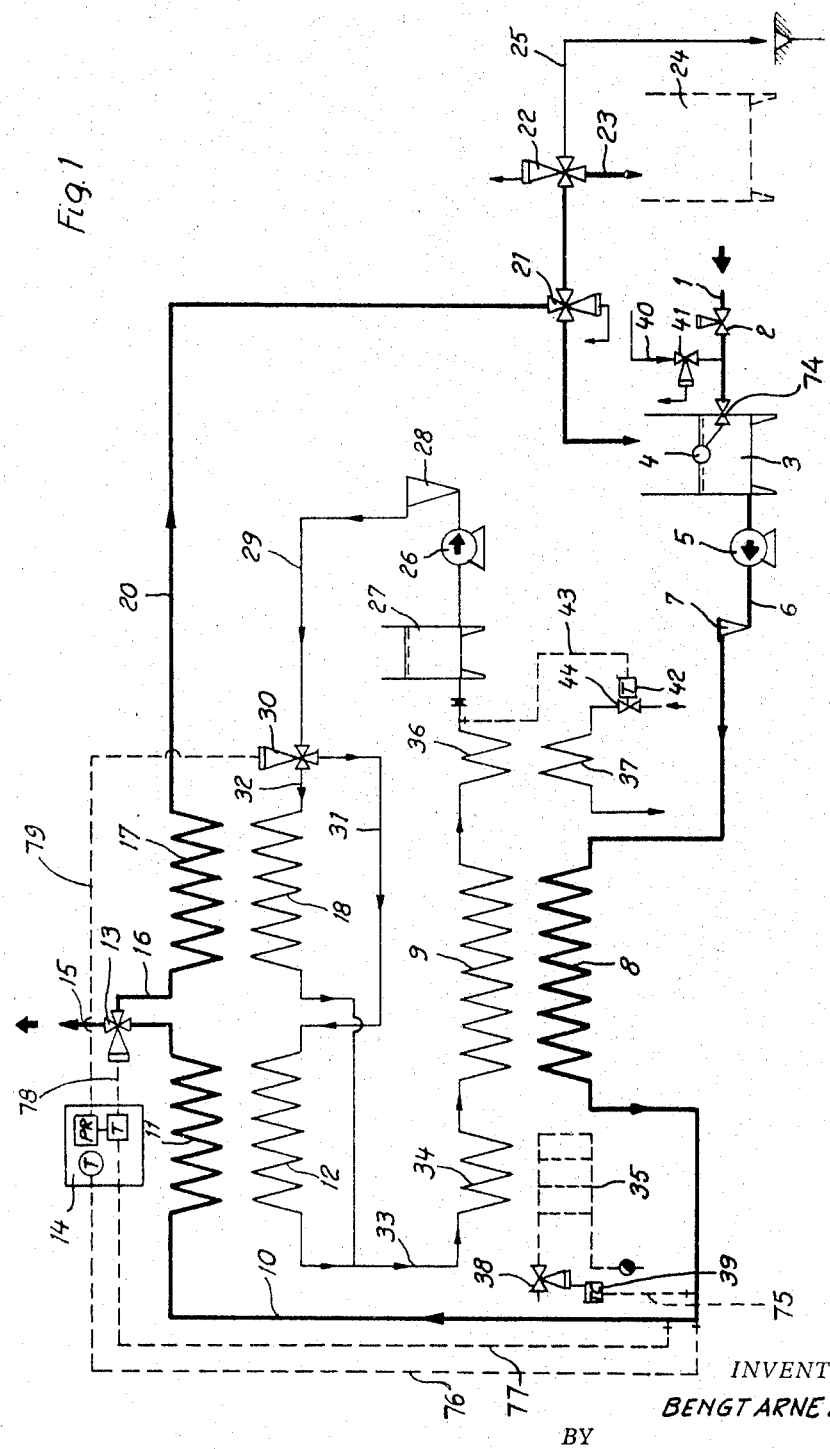

The present invention relates to the continuous heat treatment, such as pasteurizing or sterilizing, of a liquid product, such as milk, juice or the like, in a pipeline system having means for heating the product and cooling it and means for returning the product to the starting point for immediate or later repeated treatment in the pipeline system, if the product, in the first treatment, has not reached the desired heat treatment temperature.

Apparatus known for the above-noted purpose are of different types and embodiments. The product to be pasteurized or sterilized is usually heated indirectly by means of another product, usually water, in the form of liquid or steam or both; but it is also known to attain the highest temperature by direct injection of steam into the product, the steam then being removed by allowing the product to expand in a vacuum vessel from which the boiled-off steam is withdrawn. The cooling of the product is effected by the aforesaid expansion in a vacuum vessel or by means of available cold subsoil water, ice water or the like. It is also known, in order to improve the heat economy, to allow the warm product in such apparatus to emit its heat in heat exchangers so as to preheat the product being fed to the apparatus for heat treatment.

As long as this type of apparatus operates normally, in that the product during the treatment attains the prescribed pasteurizing or sterilizing temperature, there are no problems. The problems occur first when a reversion takes place, that is, when the pasteurizing or sterilizing temperature is not reached and the product must be returned for repeated treatment in the apparatus. This return is effected either manually or automatically, usually the latter. After a reversion, the apparatus or at least a part of it has become unsterile and a resterilization of the apparatus is required before it can again be used in normal operation. This sterilization can be accomplished by means of the product itself or another product, suitably water, which while being heated to the sterilizing temperature is recirculated through the apparatus for a sufficiently long time so that the latter again becomes sterile. When this has been accomplished, the apparatus must be reversed to normal operation, and also in this connection problems arise which have not been solved satisfactorily in apparatus known heretofore.

In prior apparatus of the above-mentioned type, heat is transferred to a certain degree in heat exchangers between one and the same product being subjected to treatment, in that the product passes the primary as well as the secondary side of the heat exchanger. If the product is viscous, the heat transfer will be bad. An object of the present invention, therefore, is to provide apparatus in which a heat transfer to or from the product never takes place from or to the same product but from or to another product, suitably water, which has a low viscosity and a high heat capacity.

In apparatus known heretofore, operating with regenerative recovery of heat in heat exchangers between one and the same product on the primary and secondary side of the heat exchanger, a reversion is accompanied by the phenomenon that one side of the heat exchanger forms a "blind" section for the product, which section does not take part in any circulation as long as the returning or sterilizing is in progress. This is a drawback, since the product in this blind section soon becomes cool and is not able to emit any heat to the product passing through the other side of the heat exchanger. Thus, the necessary heat must be procured in another way during the returning, as a kind of reserve. The present invention has for another object the elimination of this drawback and the provision of apparatus in which, during the returning, no blind section is created, the product to be treated circulates through the complete pipeline system, and no additional device for heating the product is necessary. At the same time, the advantage is gained that during the washing of the apparatus the latter is passed in its entirety by the washing liquid, and that the same flow route always can be maintained for both the product under treatment and the washing liquid on their way through the pipeline system.

A particularly serious drawback in the prior apparatus is the fact that after reversion and recirculation they are difficult to reverse to normal operation, since the heat equilibrium is disturbed when recirculating and cannot be restored for normal operation without additional manual measures (and in most cases several subsequent reversions). This is due to the fact that the regenerative heat exchangers for the discharging product, which must preheat the entering product during the recirculation, form blind sections which are inactive and in which the product becomes cool. When reversing from recirculation to normal operation, these blind sections are therefore not able to preheat the entering product to a sufficient degree, and the result is a new reversion. The present invention has for a further object the removal of this drawback as well, by eliminating all blind sections.

Another object of the invention is to simplify the automatic operation in the sense that the need for control means in the apparatus is reduced as compared with apparatus known heretofore.

The invention will be described in greater detail with reference to the accompanying drawings, in which FIGS. 1 through 5 are schematic views of different embodiments of the new apparatus.

In the apparatus according to FIG. 1, the product, such as milk to be pasteurized or sterilized, enters through pipeline 1, valve 2 and an equilibrium tank 3. The latter is provided with a float 4 controlling an inlet valve 74 to maintain a substantially constant liquid level in the tank. From tank 3, the milk is fed by pump 5 through pipeline 6 and a throughput controller 7 to the primary side 8 of a heat exchanger. By means of a heating medium such as water, flowing through the secondary side 9 of this exchanger in countercurrent to the milk or other product, the latter is heated to the pasteurizing or sterilizing temperature, which varies for different products under treatment. The milk is led from the heat exchanger 8–9 through pipeline 10 to the primary side 11 of a heat exchanger having the secondary side 12. In this heat exchanger, the milk is cooled to the filling or storage temperature. It then discharges through the three-way valve 13 to the filling or storage place, if it has been heated to the required temperature during the pasteurization or sterilization. The heat exchanger 11–12 will be referred to in the following as the forward flow regenerative exchanger.

A control panel 14 is instrumented to sense the temperature of the milk in the pipeline 10; and if the sensed temperature is at the desired value, the instruments of the panel 14 hold the valve 13 in position to discharge the milk through the valve 13 to the pipeline 15 and the filling or storage place. On the other hand, if the temperature sensed in the pipeline 10 is lower than the desired pasteurizing or sterilizing temperature, a so-called reversion occurs, which means that the instruments of the panel 14 reverse the valve 13 so that the pipeline 15 is shut off and a flow communication is established instead to the pipeline 16 and the primary side 17 of a heat exchanger, the secondary side of which is shown at 18. The heat exchanger 17–18 is referred to in the following as the return flow regenerative exchanger. In the latter exchanger 17–18, the milk is cooled by the water flowing through the secondary side 18. The cooled milk then flows through the pipeline 20 and the valve 21 back to the equilibrium tank 4, or through the valve 22 and the pipeline 23 to a collecting tank 24, or through the pipeline 25 to an outlet. The closed pipeline system for the milk product here described is called the first pipeline system.

Heat is supplied to and led off from the first pipeline system through a system which will be referred to as the second pipeline system. According to the invention, the latter system is a closed circuit for another product, such as water. It comprises a pump 26, which draws the water from a tank 27 and feeds it, by way of throughput controller 28 and pipeline 29, to a three-way valve 30 which, under control of the instruments of the panel 14, admits the water either to the pipeline 31 and the secondary side 12 of the forward flow regenerative exchanger or to the pipeline 32 and the secondary side 18 of the return flow regenerative exchanger. After passing through the secondary side of either one of the forward and return flow regenerative exchangers 11–12 and 17–18, which are connected in parallel, the water flows to the pipeline 33 and thence through one side 34 of a heat exchanger, the other side 35 of which has steam flowing therethrough so as to increase the water temperature on the side 34 to the temperature necessary for pasteurizing or sterilizing. Thus, when the water from the side 34 passes through the secondary side 9 of the heat exchanger 8–9, it can heat the milk passing through the primary side 8 to the desired temperature. From the heat exchanger 8–9, the water passes through a heat exchanger 36–37 in which, when necessary, it is cooled by cold water before being returned to the tank 27.

Steam is supplied to the side 35 of exchanger 34–35 through a valve 38 controlled thermostatically by an instrument 39 having an operative connection 75 to pipeline 10, whereby the milk in the pipeline 10 is maintained at the desired pasteurizing or sterilizing temperature. The instruments of the panel 14, which sense the temperature in the pipeline 10 and actuate the valves 13 and 30, are arranged so that when the desired temperature or a higher temperature prevails in the pipeline 10, the valve 13 opens the communication to the pipeline 15 and shuts off the communication to the pipeline 16, and at the same time the valve 30 opens the communication to the pipeline 31 and shuts off the communication to the pipeline 32. If the temperature of the milk in pipeline 10 is below the desired temperature, the instruments of panel 14 operate valve 13 to shut off the communication to the pipeline 15 and open the communication to the pipeline 16, at the same time they operate the valve 30 to shut off the communication to the pipeline 31 and open the communication of the pipeline 32.

Instruments suitable for the panel 14 and functioning as described are well known in the art and therefore need not be described in detail. Their operative connections to pipeline 10 are shown at 76 and 77, and their operative connections to valves 13 and 30 are shown at 78 and 79, respectively.

When the apparatus operates normally, the milk is pasteurized or sterilized in the heat exchanger 8–9 and is cooled in the forward flow regenerative exchanger 11–12, from which it discharges through the valve 13 and pipeline 15. At the same time, the return flow regenerative exchanger 17–18 is out of operation. When reversions occur, that is, when the temperature is too low in the pipeline 10 and consequently this pipeline is no longer sterile and must be sterilized, the valves 13 and 30 reverse as previously described. The secondary side 12 of the forward flow regenerative exchanger is thus put out of operation, and the primary side as well as the secondary side of the return flow regenerative exchanger 17–18 are put into operation, all the milk from the forward flow regenerative exchanger passing through side 17 of the return flow regenerative exchanger and either returning to the tank 4 or entering the tank 24. The milk can be recirculated from the tank 4 through the first pipeline system, until the apparatus becomes sterile again. Then the valves 13 and 30 are reversed to normal operation, and the apparatus will operate normally without disturbances, since the heat equilibrium in the apparatus can be maintained unchanged during the recirculation. This is due to the arrangement of the forward and return flow regenerative exchangers and their reversible secondary sides 12 and 18, which also make it possible to attain the sterilizing temperature during the recirculation effected in order to sterilize the primary side 11 of the apparatus.

Instead of sterilizing the apparatus by recirculation of milk through it, the milk can be led off to the tank 24 and be replaced by water, which is supplied through the pipeline 40 and the valve 41. When washing the apparatus, washing solution is supplied in the same way as the water; and after completion of washing, the apparatus is flushed clean and sterilized with water. Washing solution as well as flushing water are discharged from the apparatus via the valve 22 to the outlet pipe 25.

In normal operation of the apparatus, the heat exchanger 36–37 is not used, since it is not necessary to cool the water in its part 36. Such a cooling is desirable only when recirculating in order to sterilize or wash the plant, since only in that case does the temperature in the second pipeline system have a tendency to rise. This circumstance is counteracted by an additional cooling in that a temperature sensing means 42, through an operative connection 43, senses the temperature of the water returning to tank 27 and actuates the cold water valve 44 so that, when necessary, a sufficient quantity of water is admitted to the exchanger side 37 to maintain the temperature at a predetermined value.

It will be seen from the foregoing that according to the invention all heat exchange takes place between the first pipeline system for milk and the second pipeline system for water and that no heat exchange takes place from milk in the first pipeline system to milk in the same system, whereby the apparatus operates with high heat transfer number or k-values. Furthermore, it is seen that the flow direction always is the same in the two pipeline systems in normal operation as well as when recirculating in order to sterilize or wash the apparatus and that during the recirculation there is no blind section for the milk, but the complete pipeline system for the milk is passed through by milk, water or washing solution. In addition, the heat equilibrium between the two pipeline systems is always the same in normal operation as well as in recirculation, due to the novel arrangement for allowing the secondary sides 12 and 18 to function alternately. In the former case, they cooperate with the forward flow regenerative exchanger 11 for the milk and in the latter case with the return flow regenerative exchanger 17 for the milk. In this latter case the heat exchanger 36–37, when necessary, is put into operation so as to effect cooling. In such case this heat exchanger is the only auxiliary apparatus which is necessary, and its cold water consumption is very insignificant. Owing to the heat equilibrium always prevailing between the two pipeline systems, there is no risk of a new reversion when passing from recirculation to normal operation.

The embodiments according to FIGS. 2, 3, 4 and 5 are, in essential aspects, similar to the apparatus according to FIG. 1. For this reason, the same reference numerals have been used for identical parts of the different embodiments.

Figure 2:
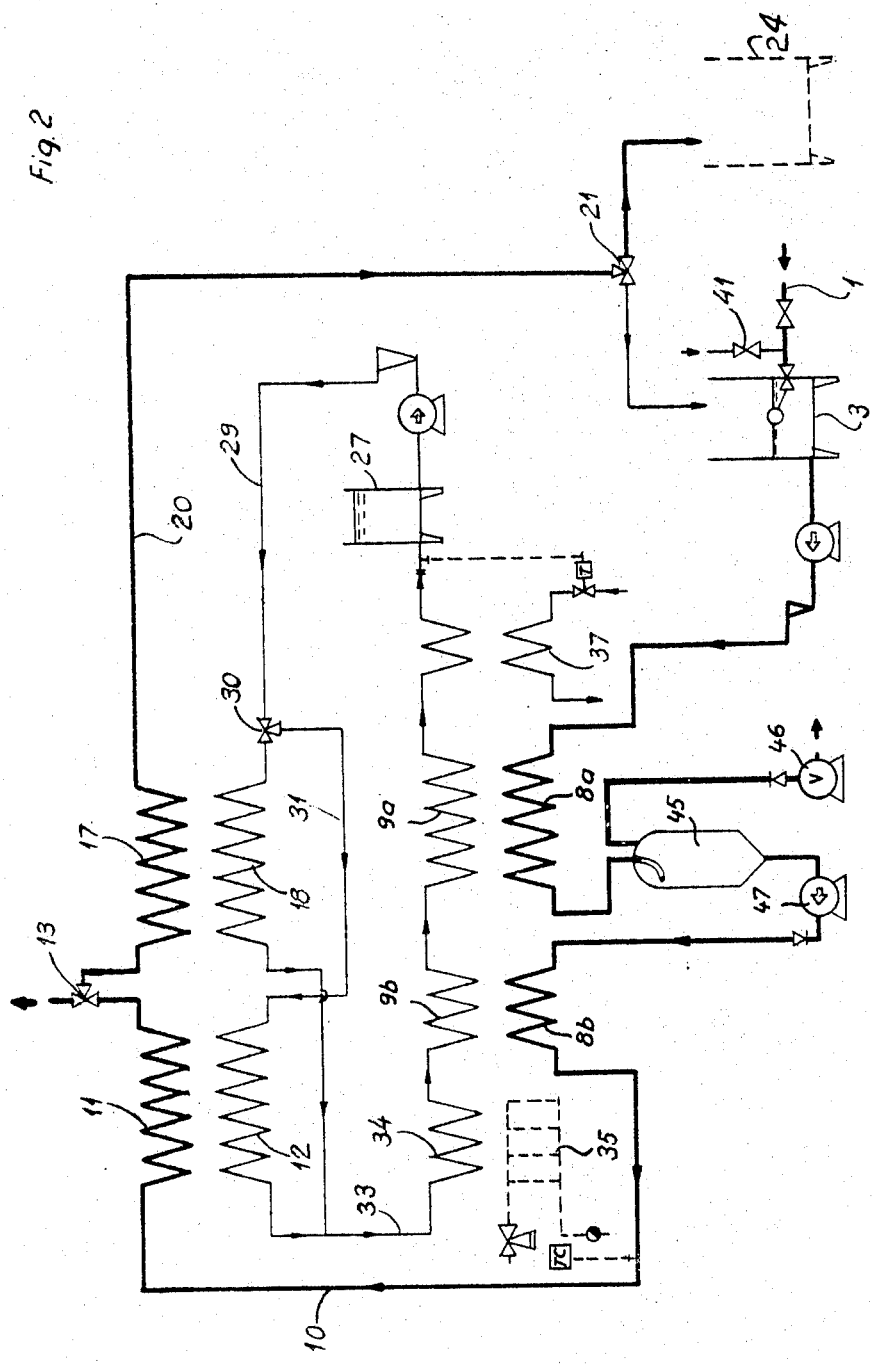

According to FIG. 2, the heat exchanger 8–9 of FIG. 1 is divided into two sections 8a–9a and 8b–9b, respectively. A degassing device including a deaeration tank 45, having a vacuum pump 46 and feed pump 47, is connected between the sections 8a and 8b.

Figure 3:
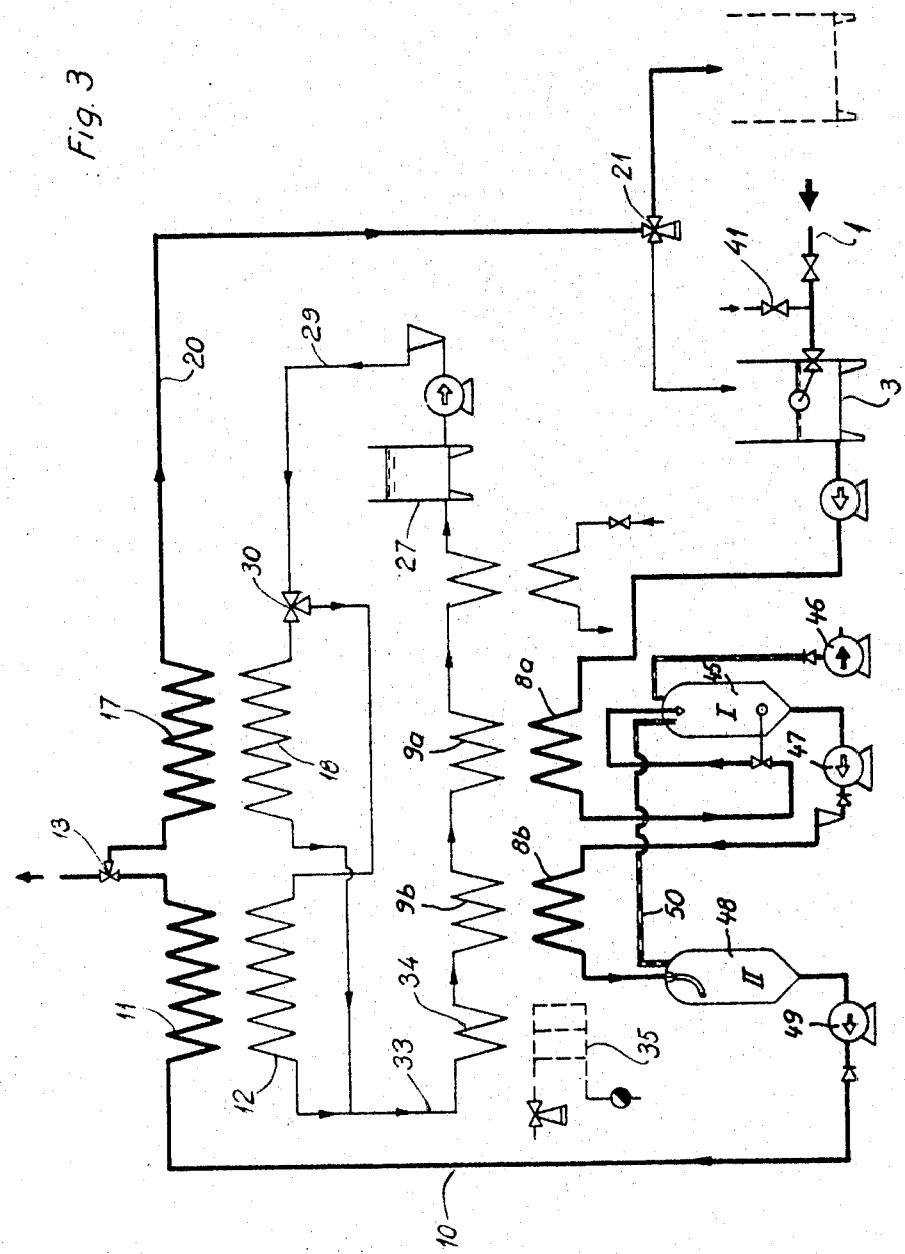

The apparatus according to FIG. 3 differs from that of FIG. 2 in that the primary side 8b of the heat exchanger section 8b–9b leads to pipeline 10 by way of an additional vacuum tank 48 provided with a feed pump 49. The tank 48 communicates through a pipeline 50 with the upper part of the tank 45, whereby essentially the same vacuum will prevail in both tanks 45 and 48, but the temperature of the milk in the tank 48 will be higher than that in the tank 45.

Figure 4:
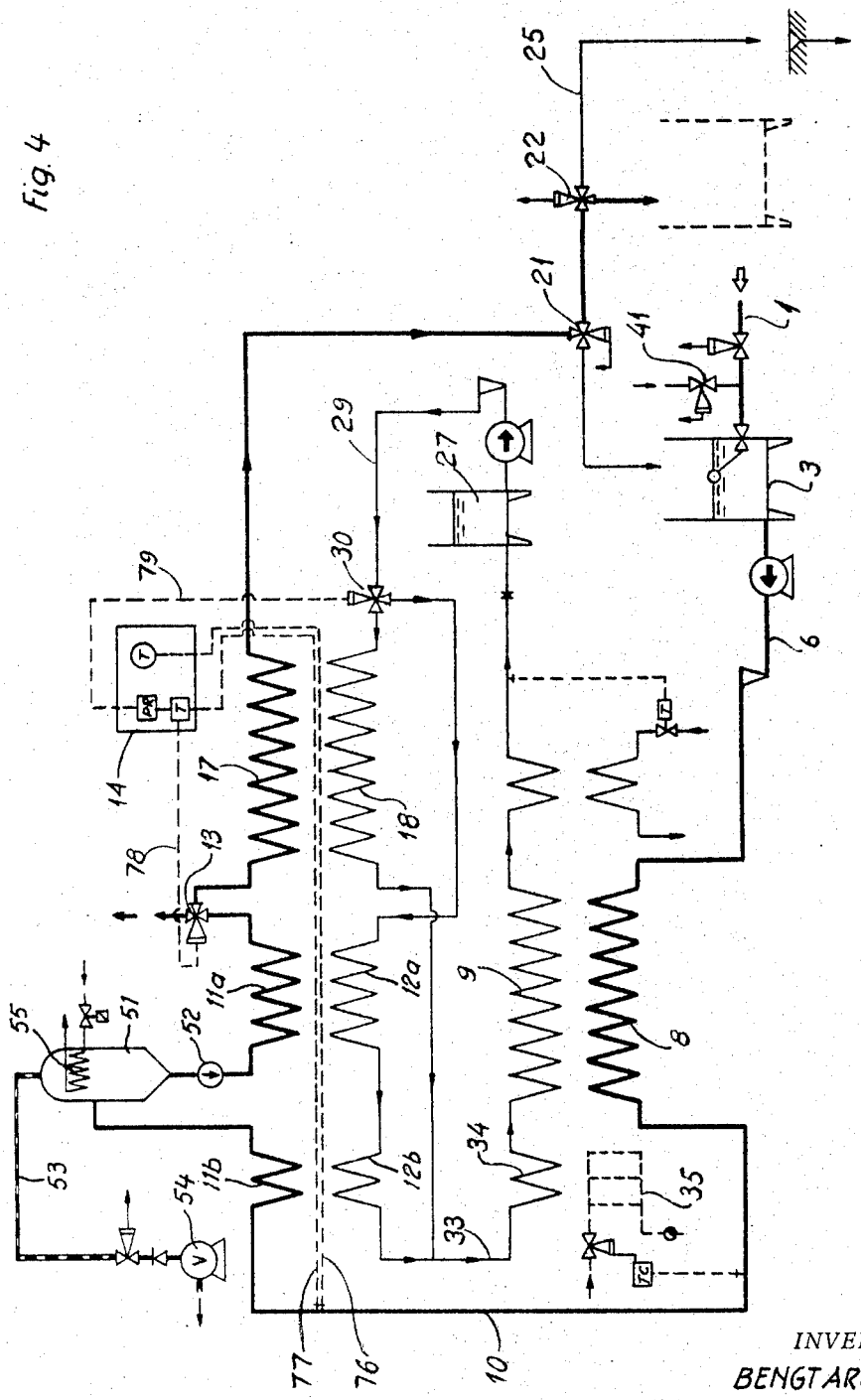

The apparatus according to FIG. 4 differs from that of FIG. 1 in the respects that the forward flow regenerative exchanger 11-12 is divided into two sections 11a-12a and 11b-12b, respectively, and that between the sections 11a and 11b there is inserted a vacuum expansion tank 51 provided with a feed pump 52. A vacuum pipeline 53 leads from tank 51 to a vacuum pump 54. In the tank 51 is a condenser 55 supplied with cooling water and serving to condense steam developed in the expansion vessel, the condensate being returned to the milk.

Figure 5:
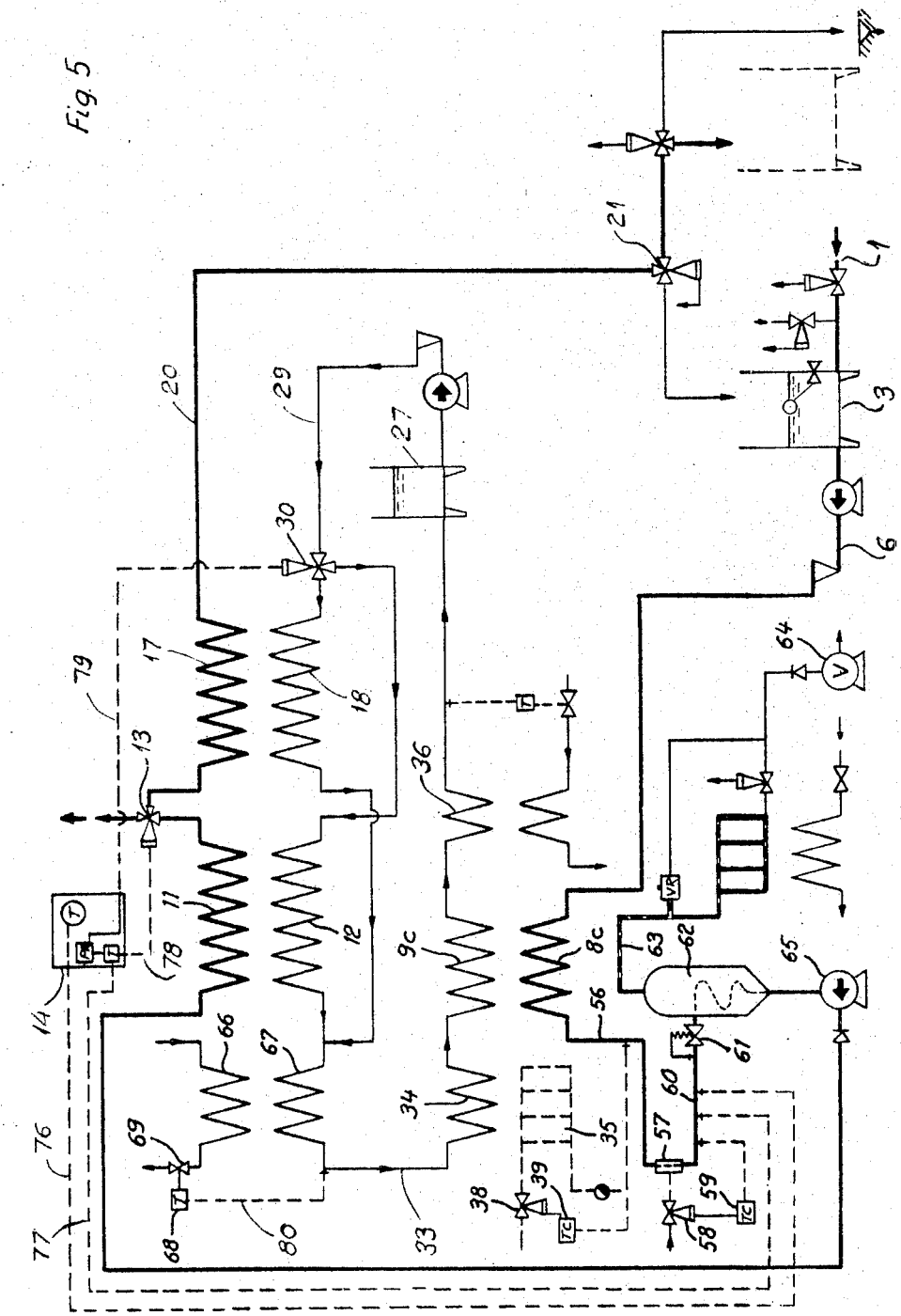

The apparatus according to FIG. 5 differs from that of FIG. 1 in that while the heat exchanger 8–9 in FIG. 1 is used to heat the milk to the pasteurizing or sterilizing temperature, the corresponding heat exchanger 8c–9c in FIG. 5 is used only for preheating the milk to a predetermined temperature. For this reason steam is supplied to the heat exchanger 34–35 through the valve 38, which is actuated by the instrument 39. In this case, the latter senses the temperature in the pipeline 56 following the section 8c and maintains this temperature at the desired value by actuation of the valve 38. The pasteurizing or sterilizing of the milk is effected by direct steam injection into it. To this end, the milk after being preheated in the section 8c passes through pipeline 56 to a steam injection device 57. The steam is supplied to this device through a valve 58, which is actuated by an instrument 59. The latter senses the temperature of the milk in the pipeline 60 leading from the steam injection device and actuates the valve 58 so that this temperature is maintained at a constant value. Because the injected steam is condensed in the milk and dilutes it, the milk passes from the pipeline 60 through an expansion valve 61 into an expansion vessel 62, where the same amount of steam is boiled off from the milk as the amount earlier injected into the milk and condensed in it. The steam boiled off is removed by means of the pipeline 63 and the vacuum pump 64. The milk cooled by the expansion is then conveyed by the pump 65 from the vessel 62 to the forward flow regenerative exchanger 11-12.

Due to the expansion cooling of the milk in the vessel 62, the milk has a lower temperature at its arrival at the forward flow regenerative exchanger in FIG. 5 than at its arrival at the forward flow regenerative exchanger in FIG. 1. For this reason the forward flow regenerative exchanger 11-12 in FIG. 5 for cooling the milk can be smaller than that in FIG. 1. This means on the other hand that when recirculating in order to sterilize the apparatus according to FIG. 5, an additional heat exchanger 66–67 should be provided so as to cool the section 67 by means of cold water passing through the section 66. This cooling is controlled by an instrument 68, which through an operative connection 80 senses the temperature in the second pipeline system beyond the section 67 and maintains this temperature at a desired value by actuation of the valve 69.

I claim:
1. Apparatus for continuous heat treatment, such as pasteurizing or sterilizing, of a first liquid product, the apparatus comprising indirect heat exchange means having primary sides for respectively heating and cooling said product and also having secondary sides for passage of a second liquid product, a first pipeline system having a starting point for said first product and including said primary sides, said first pipeline system also having means for returning the first product to said starting point for repeated treatment in the system upon failure of the first product to acquire a predetermined heat treatment temperature from said heating, and a second pipeline system forming a circuit for said second liquid product and including said secondary sides of the indirect heat exchange means, whereby the product under treatment in said first pipeline system is in indirect heat exchange relation to another liquid product in said second pipeline system, said indirect heat exchange means including a forward flow regenerative exchanger and a return flow regenerative exchanger for cooling said first product, said return means including a first valve connected between the primary sides of said exchangers and movable between a return position for feeding said first product from the forward flow to the return flow regenerative exchanger and a withdrawal position for discharging the first product from the first pipeline system, the secondary sides of said regenerative exchangers being connected in parallel to each other in said second pipeline system, said second system including a second valve operable selectively to direct the second liquid product through one or the other of said forward and return flow regenerative exchangers.

2. Apparatus according to claim 1, said two pipeline systems being arranged to operate in countercurrent flow relation, said first pipeline system comprising, in the order as seen in the flow direction therethrough, an equilibrium tank for the first product, the primary side of a said heat exchange means for heating the first product to its heat treatment temperature, the primary side of the forward flow regenerative exchanger, said first valve, the primary side of said return flow regenerative exchanger, and pipeline for eventually returning the first product to said equilibrium tank, said second pipeline system comprising, in the order as seen in the counterflow direction therethrough, the secondary side of said exchange means for heating the first product to its heat treatment temperature, a heat exchanger for indirect supply of heat to the second pipeline system from a third product, the parallel-connected secondary sides of said regenerative exchangers, said second valve, and a circuit-completing pipe.

3. Apparatus according to claim 2, in which said circuit-completing pipe includes a heat exchanger for indirectly drawing off heat from the second pipeline system by means of a fourth product.

4. Apparatus according to claim 1, said two pipeline systems being arranged to operate in countercurrent flow relation, said first pipeline system comprising, in the order as seen in the flow direction therethrough, an equilibrium tank for the first product, the primary side of a said heat exchange means for heating the first product to its heat treatment temperature, the primary side of the forward flow regenerative exchanger, said first valve, the primary side of said return flow regenerative exchanger, and a pipeline for eventually returning the first product to said equilibrium tank, said second pipeline system comprising, in the order as seen in the counterflow direction therethrough, the secondary side of said exchange means for heating the first product to its heat treatment temperature, a heat exchanger for indirect supply of heat to the second pipeline system from a third product, the parallel-connected secondary sides of said regenerative exchangers, said second valve, and a circuit-completing pipe, said heat exchange means for heating the first product being divided into two sub-exchangers, the first pipeline system including a first degassing device inserted between said sub-exchangers.

5. Apparatus according to claim 4, in which said first pipeline system also includes a second degassing device inserted between said divided heat exchange means and said first valve, and means for operating said two degassing devices at essentially the same sub-atmospheric pressure but at a lower temperature of the first product in said first degassing device than in said second degassing device.

6. Apparatus according to claim 1, said two pipeline systems being arranged to operate in countercurrent flow relation, said first pipeline system comprising, in the order as seen in the flow direction therethrough, an equilibrium tank for the first product, the primary side of a said heat exchange means for heating the first product to its heat treatment temperature, the primary side of the forward flow regenerative exchanger, said first valve, the primary side of said return flow regenerative exchanger, and a pipeline for eventually returning the first product to said equilibrium tank, said second pipeline system comprising, in the order as seen in the counterflow direction therethrough, the secondary side of said exchange means for heating the first product to its heat treatment temperature, a heat exchanger for indirect supply of heat to the second pipeline system from a third product, the parallel-connected secondary sides of said regenerative exchangers, said second valve, and a circuit-completing pipe, said forward flow regenerative exchanger being divided into two sub-exchangers, the first pipeline system including between the primary sides of said sub-exchangers a vacuum expansion vessel having a cooling device for recondensing and returning the first product to said first system.

7. Apparatus according to claim 1, said first pipeline system comprising, in the order as seen in the flow direction therethrough, an equilibrium tank, the primary side of a heat exchanger for pre-heating said first product, a device for direct injection of steam into the first product to heat it to the heat treatment temperature, and a vacuum expansion vessel for removing from the first product steam corresponding in quantity to said injected steam.

8. Apparatus according to claim 7, in which said second pipeline system includes a heat exchanger for indirectly cooling the second product with a third product.

9. In an apparatus for continuous pasteurizing or sterilizing of a liquid, the combination of a pipeline system for passage of said liquid and having an inlet side, heat exchange means for heating the liquid flowing in said system to a heat treating temperature, a forward flow regenerative heat exchanger having primary and secondary sides, said primary side being inserted in the pipeline system to cool the heated liquid from said heat exchange means, a return flow regenerative heat exchanger having a primary side for cooling the liquid, valve means connected to the primary side of said forward flow regenerative heat exchanger and operable selectively to direct the heat treated liquid therefrom to a destination outside the system or to return he liquid by way of said primary side of the return flow regenerative heat exchanger to said inlet side of the pipeline system for repeated treatment therein, upon failure of the liquid to attain said heat treating temperature, and means for shutting off flow through said secondary side of the forward flow regenerative exchanger when the liquid is returned to said inlet side of the system.

10. The combination according to claim 9, comprising also a second pipeline system for passage of a different medium than said liquid, said heat exchange means for heating the liquid having a primary side included in sid second system, the secondary sides of said regenerative exchangers being connected in parallel and included in said second system.

11. The combination according to claim 10, in which said second pipeline system also includes separate means for heating and cooling said medium.

References Cited

UNITED STATES PATENTS

| | | | |
|---|---|---|---|
| 972,608 | 10/1910 | Feldmeier | 165—66 |
| 1,863,786 | 6/1932 | Feldmeier et al. | 99—212 XR |
| 2,455,605 | 12/1948 | Olson | 165—66 XR |
| 2,547,430 | 4/1951 | Aldrige et al. | 165—66 XR |
| 2,662,508 | 12/1953 | Gaylor | 165—66 XR |
| 3,010,832 | 11/1961 | Dahlstedt | 165—66 XR |
| 3,101,041 | 8/1963 | Hallstrom | 165—40 XR |

FOREIGN PATENTS 78,541   6/1930   Sweden.

FRED C. MATTERN, JR., *Primary Examiner.*

M. ANTONAKAS, *Assistant Examiner.*

U.S. Cl. X.R.

99—212